United States Patent [19]

Olson et al.

[11] Patent Number: 5,308,036

[45] Date of Patent: May 3, 1994

[54] KINEMATIC ISOLATION STAND CONNECTOR

[75] Inventors: James D. Olson, San Mateo; Thomas E. Clawges, Pleasanton; Robert T. LoBianco, Mountain View, all of Calif.

[73] Assignee: Optical Specialties Inc., Fremont, Calif.

[21] Appl. No.: 739,897

[22] Filed: Aug. 2, 1991

[51] Int. Cl.5 .............................................. F16M 3/00
[52] U.S. Cl. .............................. 248/638; 188/321.11; 248/677; 403/76
[58] Field of Search ................... 248/638, 677, 188.8, 248/615, 621, 632, 501, 502; 188/321.11; 403/77, 76, 122

[56] References Cited

U.S. PATENT DOCUMENTS

| | | | |
|---|---|---|---|
| 2,632,198 | 3/1953 | Becker | 248/615 X |
| 3,477,674 | 11/1969 | Schaller | 248/615 |
| 4,432,668 | 2/1984 | Rank | 403/122 X |
| 4,473,239 | 9/1984 | Smart | 248/677 X |
| 4,575,034 | 3/1986 | Tobey | 248/677 X |
| 4,718,631 | 1/1988 | Reynolds et al. | 248/677 X |
| 4,842,095 | 6/1989 | Rozek | 248/638 X |

OTHER PUBLICATIONS

E-A-R Information Sheet regarding Isodamp Pads (no date available).

Primary Examiner—Ramon O. Ramirez
Attorney, Agent, or Firm—John A. Frazzini

[57] ABSTRACT

A connector that couples a leg of one object to a leg of a second object to prevent relative translation motion between these two objects and that does not transmit substantial vibrational energy between these objects. This connector is attached at a base of each object and is preferably attached to a pad of damping material at the base of each object.

10 Claims, 4 Drawing Sheets

KINEMATIC ISOLATION STAND CONNECTOR

In the figures, each element indicated by a reference numeral will be indicated by the same reference numeral in every figure in which that element appears. The first digit of any reference numeral indicates the first figure in which its associated element is presented.

BACKGROUND OF THE INVENTION

This invention relates in general to a connector for maintaining a fixed spacing between two pieces of apparatus and relates more particularly to a connector that transmits only a negligible amount of vibration from a first of these two apparatus to a second of these two apparatus. Such a connection is useful in automated vibration sensitive tools, such as a registration tool, which is utilized to calibrate and correct a stepper that is to produce accurate alignment between successive layers of an integrated circuit.

Integrated circuits typically consist of several layers of material that are patterned and interconnected in such a manner that these layers produce the desired integrated circuit. There are many different processes for producing patterned layers, but regardless of the manner of producing each layer, in order to achieve an acceptable yield of good circuits, it is crucial to accurately align every patterned layer with all other patterned layers of that circuit.

In a typical wafer fabrication process, each of these patterned layers is formed by the steps of: (a) depositing on the wafer a layer of resist; (b) exposing this layer with radiation to produce a pattern of exposed regions in this layer; (c) developing the resist to produce a contact mask; and then (d) processing the wafer through this contact mask. In these steps, the resist can, for example, be a photoresist that is exposed by light imaged through a projection mask or can be a resist that is sensitive to incidence of an electron beam that is controlled to produce the desired pattern of exposure in the resist. In each of these cases, the resist layer is developed to produce the contact mask. The contact mask can be used, for example, during deposition or implant steps to determine where material is added to the wafer and can also be used, for example, during etching steps to determine where material is removed from the wafer.

In the future, it may be possible to produce patterned layers on the wafer by mechanisms that do not utilize either a projection mask or a contact mask. Therefore, the apparatus utilized to produce a patterned layer on the wafer will be referred to herein generically as the "pattern generator".

In most integrated circuit manufacturing processes, a stepper is utilized to produce concurrently a two dimensional pattern of identical integrated circuits on an integrated circuit wafer, thereby greatly increasing the throughput of the integrated circuit manufacturing process. This stepper can accurately translate an integrated circuit wafer in each of two perpendicular directions that are parallel to a major planar surface of this wafer.

To achieve a commercially acceptable yield of good integrated circuits, it is critical that all of the layers are accurately aligned translationally and rotationally. Because the patterns are typically produced on a wafer by projection techniques, it is also critical that the magnification of the projection be correct. Lens aberrations can also affect the pattern being projected. Therefore, once a pattern is ready to be projected onto the wafer, a test wafer is produced that is then measured by a registration tool to determine whether there is any translational or rotational misalignment and whether the magnification of the projection is correct. If one or more of these parameters is incorrect, the stepper is corrected and another test wafer is produced and tested. This is repeated until accurate alignment is achieved. FIG. 1 is a schematic view of the front panel of such a registration tool.

Within registration tool 11, a microscope magnifies the alignment marks sufficiently (typically, a magnification on the order of 1,000 times) that the desired alignment accuracy is achieved. A light source illuminates the wafer within a microscope field of view that has a diameter typically on the order of 250 microns. Within this field of view is a smaller region of diameter on the order of 50 microns within which there is negligible optical distortion. This latter region is referred to herein as the "distortionless region" of the microscope.

Several alignment marks are spaced throughout the test wafer so that the locations of several ma ks can be measured to determine whether the translational and rotational parameters are correct and whether the magnification is correct. Measurement of the locations of these alignment marks was historically achieved manually, but is preferably achieved automatically to reduce the time required to make such measurements and to improve the accuracy and repeatability of such measurements. Likewise, as illustrated in the block diagram of FIG. 2, for improved throughput, it is advantageous to utilize a robot 21 to transfer wafers between a wafer stack 22 and a microscope 23.

For production of 4 Megabit RAMS, the maximum allowable misalignment between the circuit being processed and the pattern generator is approximately 150 nanometers, thereby requiring that microscope 23 be substantially free of vibration during every measurement step. The allowable tolerance for a measurement tool is typically 10% of the allowable tolerance of the pattern generator. It is therefore important to prevent transmitting to microscope 23 any vibrations from such sources as robot 21, a keyboard 12 mounted on the outside enclosure of registration tool 11 and cooling fans within registration tool 11. Therefore, microscope 23 mounted on an isolation stand 24 that makes no direct physical contact with either robot 21 or with the outer enclosure 13 on such fans (not shown) are mounted to cool the inside of registration tool 11.

This isolation stand is much more massive than the robot and the rest of the system, so that any vibrational energy coupled from the robot or the environment to the isolation stand is distributed over this large mass, thereby reducing the magnitude of vibration of any portion of this isolation stand. The mass of the isolation stand is typically on the order of 2,000 pounds. Isolation stand 24 has a plurality of legs 16, each of which is supported on a pad 14 of damping material (such as Isodamp, available from E.A.R. Corp, located at 7911 Zionsville Road, Indianapolis, Ind. 46268-0898) that absorbs most of the vibrational energy coupled through the floor to the isolation stand. By "damping material" is meant any material such as these Isodamp pads that strongly absorb vibrational energy. This isolation enables microscope 21 to provide a crisp image of the wafer, thereby enabling accurate measurement of the translational and rotational alignment of each circuit with the pattern generator during processing of that circuit by the Pattern generator.

Critical alignment is essential between the robot and the microscope to allow the system to quickly find taught alignment targets. Unfortunately, if registration tool 11 is inadvertently bumped, this can disturb alignment between the microscope and the robot sufficiently that no alignment mark will be present within the field of view of the microscope. If such Misalignment between the robot and the microscope is small enough, execution of a spiral search pattern by the microscope stage can locate an alignment mark and then home in to that mark. Although occurrences of such small amounts of misalignment and the associated implementation of a search pattern only degrade throughput, larger amounts of misalignment between the robot and the microscope will cause the taught pattern to fall outside of the Spiral search area, causing an automated system to reject the wafer. Therefore, it would be advantageous to have a connector that maintains alignment between the robot and the microscope without coupling a significant amount of vibration to the microscope from the robot, keyboard, fans and other sources of vibration within the registration tool.

SUMMARY OF THE INVENTION

In accordance with the illustrate preferred embodiment, a connector is presented that enables a first apparatus to be coupled to a second apparatus in such a manner that: (1) the spacing between these two apparatus is kept substantially constant; and (2) substantially no vibrational energy is coupled between these apparatus. This connector couples these two apparatus together at floor level to prevent transmission of energy from vertical vibrational modes of one apparatus to the other apparatus. This occurs because the floor is such a rigid, massive object that the vibrational modes in either apparatus have a node at floor level. Because the connector is located at a node, the vertical vibrations in the leg have substantially zero amplitude at the connector, thereby preventing the transfer of vibrational energy from the vertical vibrational modes of this leg through the connector to the other leg to which the connector is attached.

Preferably, at least one of the legs to which this connector is attached terminates in a rotatable levelling pad that is rotatable along the direction of a line connecting the two legs to which the connector is attached. For this manner Of coupling, any longitudinal vibrations in the outer frame Will couple into small rotations of this rotatable leveling pad instead of transmitting vibrations through the coupling to which this levelling pad is connected. This prevents transport of horizontal vibrations between the two legs to which this connector is attached. Therefore, locating this connector at the floor and utilizing a rotatable levelling pad at the base of at least one of these legs substantially eliminates the transport of vibrational energy through this connector from one leg to the other to which it is attached. Preferably, a rotatable levelling pad is utilized under both legs so that this isolation for horizontal Vibration modes occurs at both legs. This rotatable levelling pad is preferably a ball joint type pivot joint so that there is no need to align this pivot relative to the line between the connected legs to eliminate coupling of horizontal vibrations.

This connector preferably attaches to a pad of damping material positioned under a leg of either the first apparatus or the second apparatus. This manner of coupling provides additional attenuation of any vibrations connected from the first apparatus into the connector. Preferably, this connector attaches to a damping pad under each of these two legs so that both damping pads attenuate any residual vibrations.

This design differs from previous designs in that it has a very high stiffness and very low transmission of vibration. Typical isolators having good vibration absorption unfortunately also exhibit large amounts of deflection. In general, the natural vibrational frequency f of any isolator obeys the relationship $2\pi f = (k/m)^{\frac{1}{2}}$ where k is the spring constant of this isolator and m is the effective mass of the two objects between which the isolator is connected. Therefore, increasing the mass and decreasing the spring constant (i.e., reducing the stiffness of this isolator) reduces the natural frequency f and results in a lower transmission of energy. Although the amount of energy absorbed or reflected is large, the amount of deflection is also large and therefore is unsuitable for use in automation systems like registration tools in which such large deflections are unacceptable and critical positioning between components is required.

DESCRIPTION OF THE PREFERRED EMBODIMENT

Figure 1:
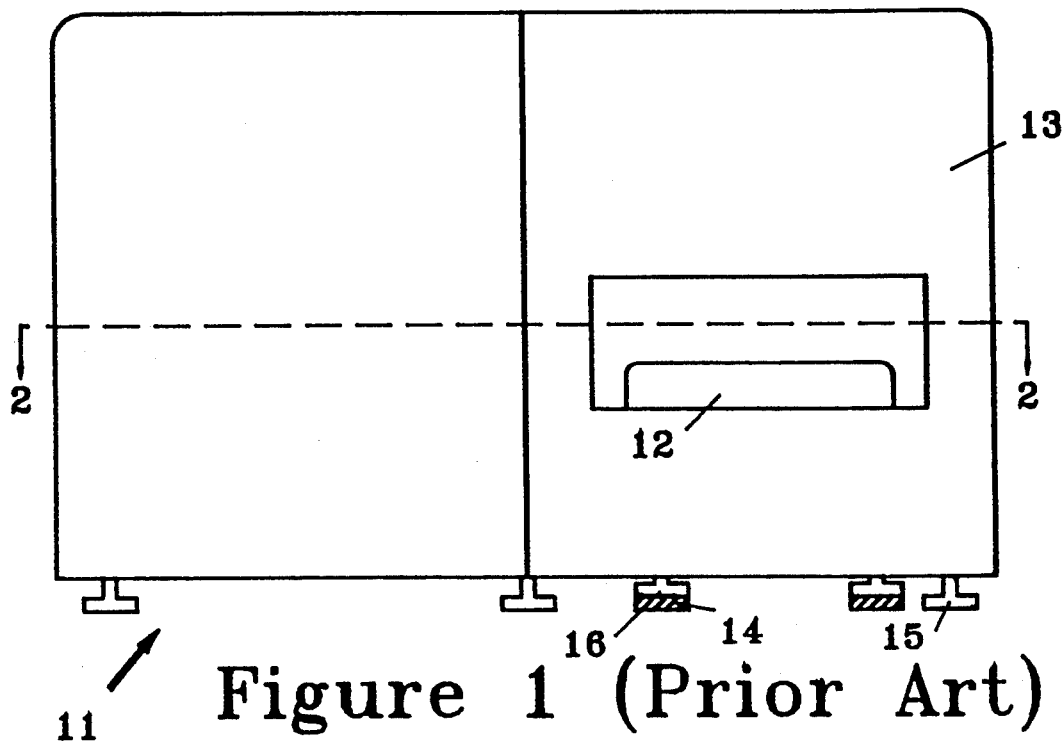
FIG. 1 is a schematic view of the front of a registration tool to illustrate the locations of the cross-sectional views of FIG. 2 and 3.
Figure 2:
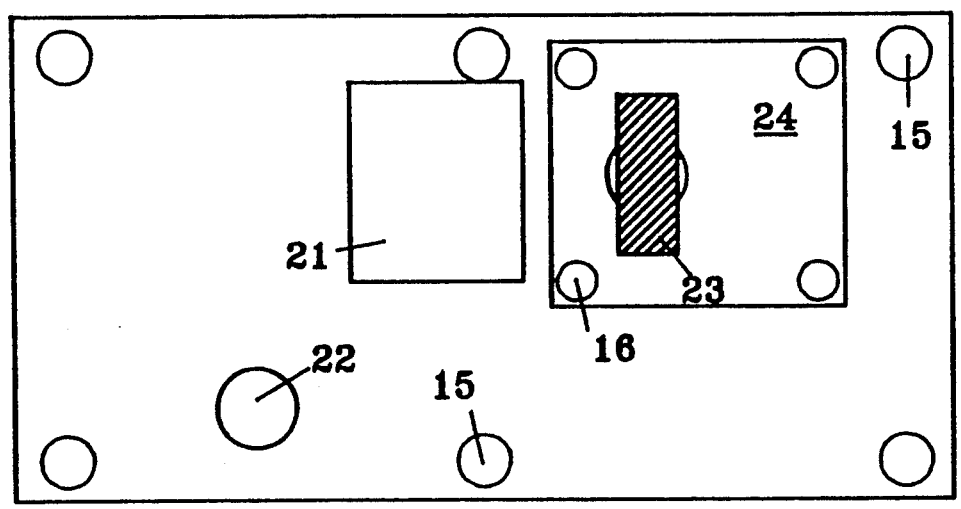
FIG. 2 is a top cross-sectional view of the registration tool of FIG. 1 illustrating the use of an isolation stand to isolate a microscope from vibrations produced by other components of the registration tool.
Figure 3:
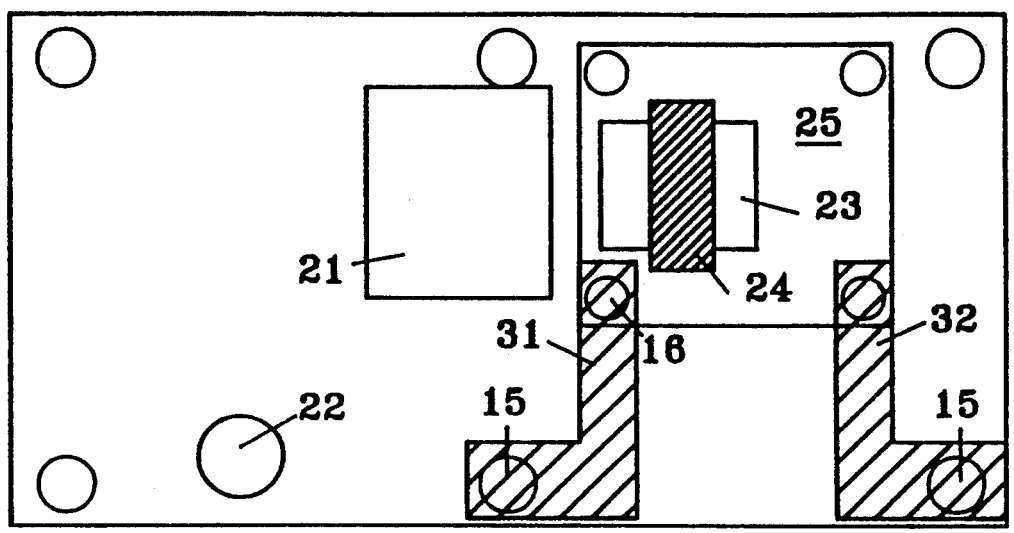
FIG. 3 is a top cross-sectional view as in FIG. 2 illustrating the locations of connectors to prevent relative displacement between the robot and the microscope.

FIG. 3 illustrates the addition to the registration tool illustrated in FIG. 2 of a pair of connectors 31 and 32 that each connects a leg 15 of the registration tool enclosure to a leg 16 of the isolation stand to prevent relative displacement between the robot and the microscope. To prevent both translational and rotational motion of the microscope relative to the robot, at least two connectors should be used as indicated in this figure.

Figure 4:
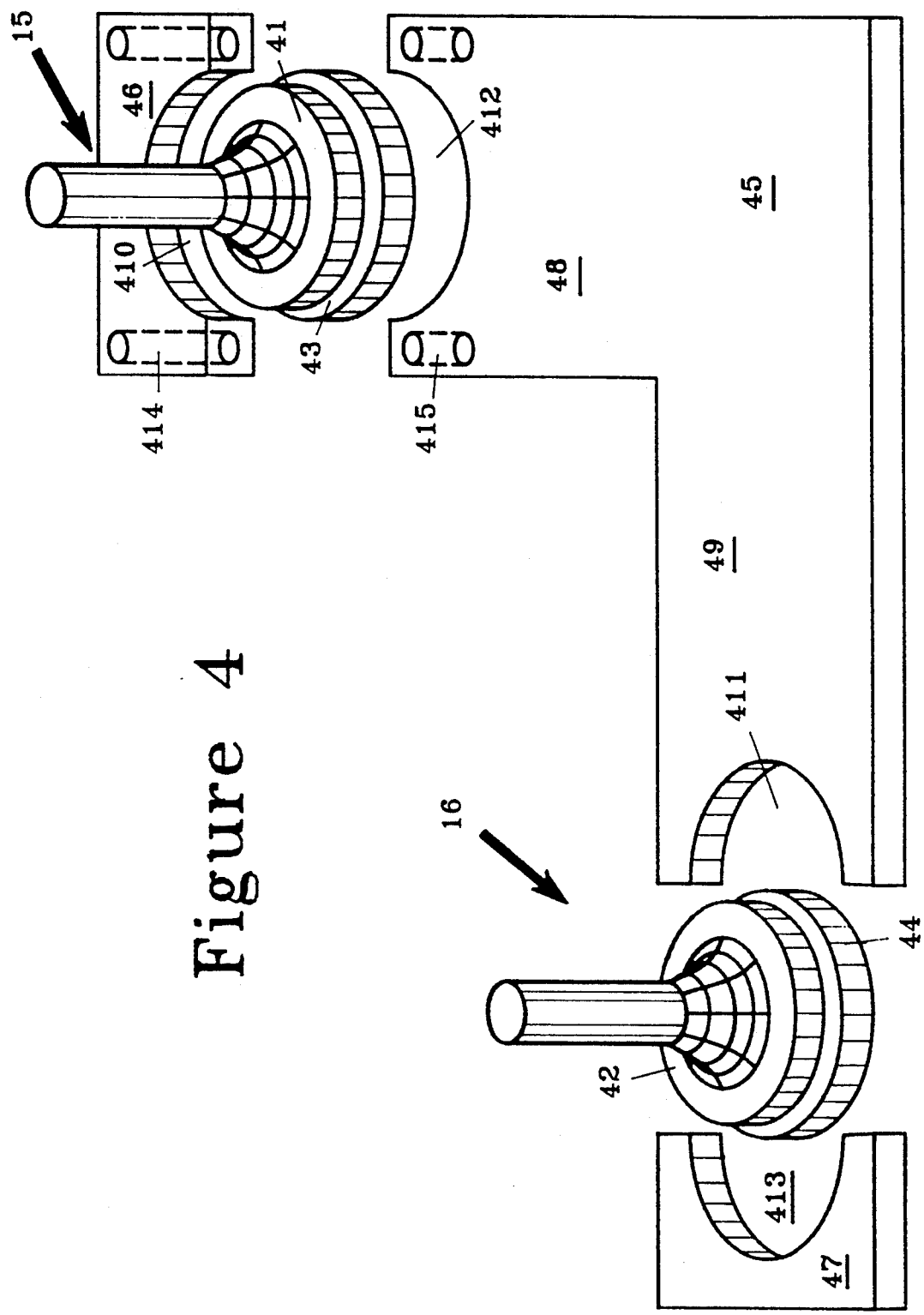
FIG. 4 is a projective view illustrating the connector of FIG. 3 in greater detail.

FIG. 4 is a perspective view of connector 31, showing the lower portions of the legs 15 and 16 that it is to connect. The base portions 41 and 42 of legs 15 and 16, respectively, each are in direct contact with and supported on a pair of cylindrical pads 43 and 44 of a vibration damping material such as Isodamp, available from E.A.R. Corporation. Such pads can be attached to these legs (e.g., by bonding them to the legs), but in general the weights of the isolation stand 24 and the registration tool enclosure 13 are sufficient to effectively attach these legs to their respective pads. The force between this pad and leg, whether due to bonding between the leg and pad or due to frictional force arising from the weight of the leg and stand or enclosure will be referred to as a "contact force" between the pad and leg. Connector 31 is directly connected between pads 43 and 44 and is only indirectly coupled to legs 15 and 16 via these pads. This manner of coupling these two legs via the isolation pads has the advantage of incorporating a pair of vibration absorbing sections within the connection between the isolation stand 24 and the enclosure 13, thereby further reducing the amplitude of vibration between these two elements.

Connector 31 includes an L-shaped center piece 45 and a pair of end pieces 46 and 47. In the ends of sections 48 and 49 of the L-shaped center piece 45 are semicircular recesses 411 and 412, each respectively, of diameter equal to the diameter of the cylindrical Isodamp pad to which it is to attach. Similarly, end pieces 46 and 47 have semicircular recesses 410 and 413 of diameter equal to the diameter of the Isodamp pad to which it is to attach. End piece 46 includes a pair of cylindrical bores 414 through each of which a bolt can be threaded into an associated threaded bore 415 in the end of section 48. Similar bores (not shown) are included in end piece 47 and in the end of section 49.

Figure 5:
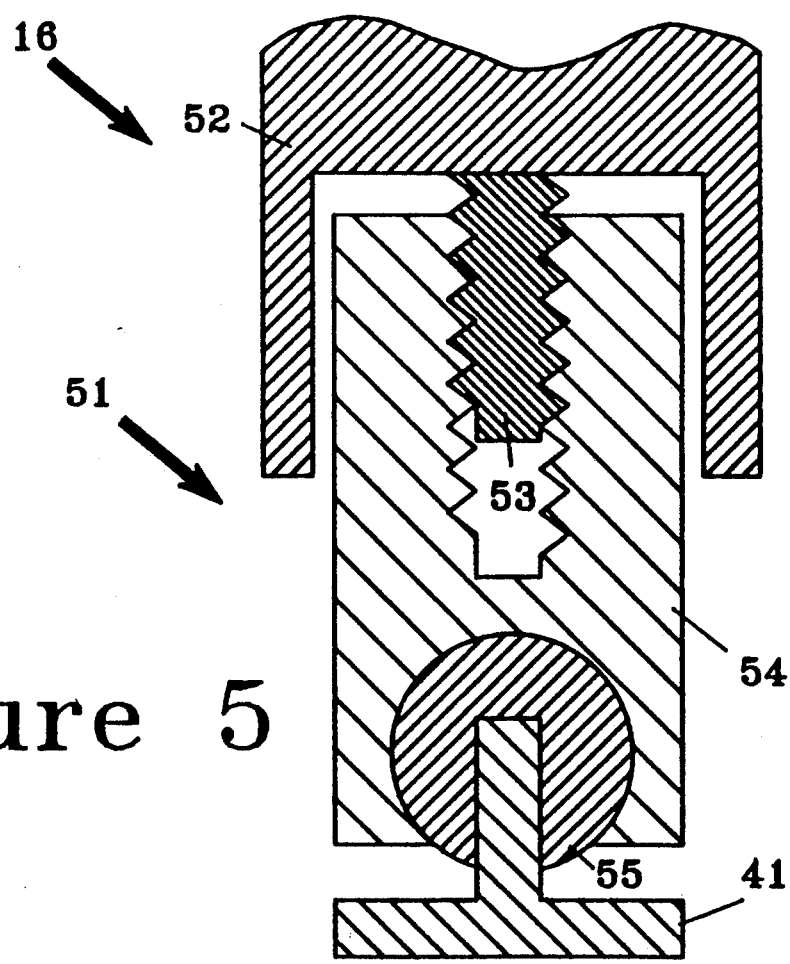
FIG. 5 illustrates a ball joint type levelling pad that is to be located at the bottom of at least one of the legs to which the connector of FIG. 4 is attached.

At the base of each of legs 15 and 16 is a ball joint type levelling pad 51 of the type illustrated in FIG. 5. Extending from a bottom end 52 of leg 16 is a bolt 53 onto which is threaded an adjustable sleeve 54 to enable adjustment of the length of leg 16 to level stand 24 and to provide support of stand 24 by all four of its legs. A ball joint 55 enables base 41 to tilt as needed to fit flush against the floor.

Besides enabling isolation stand 24 and enclosure 13 to be stably supported, these ball joint type levelling pads also provide an important contribution to limiting transmission of vibrations from enclosure 13 to isolation stand 24. This ball joint at the base of a leg 15 of the enclosure will significantly attenuate the transmission to connector 31 of the horizontal component of vibrations in this leg. Similarly, only a small fraction of any residual horizontal vibration that is transmitted from leg 15 to connector 31 will be transmitted to leg 16 because the ball joint at the base of leg 16 will tend to convert horizontal vibrations in the connector into small oscillatory rotations of this ball joint rather than to transmit such vibrations to leg 16.

For the horizontal vibration component along the direction between the legs that are coupled by this connector, this rotation will be about a horizontal axis that is perpendicular to this direction between these two legs. For the horizontal vibration component in leg 15 along a direction perpendicular to the direction between these two legs, this horizontal component will tend to rotate ball joint 55 about an axis parallel to the direction between these two legs. Such rotations are so small that they transmit a negligible amount of energy compared to the horizontal vibration component along the direction between these two legs that this component is already negligible. Thus, a levelling pad that is rotatable only about an axis approximately perpendicular to the direction between these two legs would also substantially eliminate transmission of the horizontal component of vibrations from the enclosure to the isolation stand. Therefore, the levelling pad can have only this one axis of rotation. However, it is preferable to utilize the ball joint type levelling pad both for omnidirectional vibration attenuation purposes and for levelling purposes.

This connector also substantially eliminates the transmission of the vertical component of vibrations in leg 15 to leg 16 because this connector is located at floor level. Because of the large mass of the floor, any vertical vibrations reflect at the floor, thereby producing vibration modes that have a node at floor level. Because of these nodes, the vertical vibrations in leg 15 are substantially zero at floor level, thereby substantially eliminating the transmission of energy from these vertical vibrations in leg 15 to leg 16.

Figure 6:
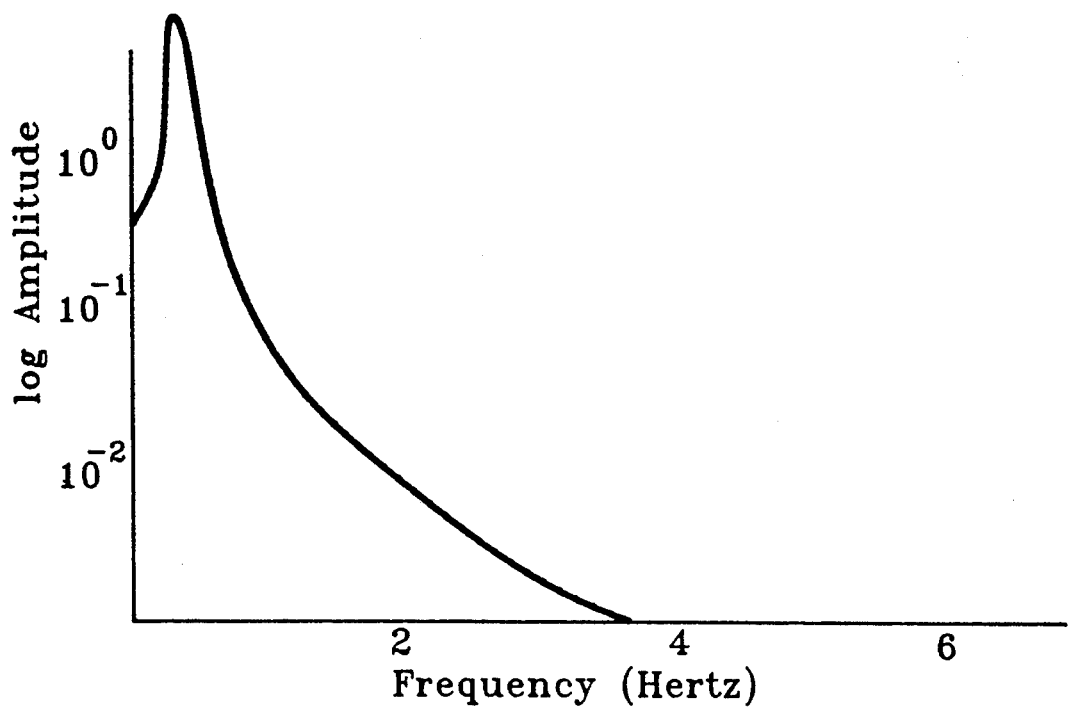
FIG. 6 illustrates the amplitude of vibration of the isolation stand when this stand is connected to the registration tool enclosure by a rigid connector located about 5 inches off of the floor.
Figure 7:
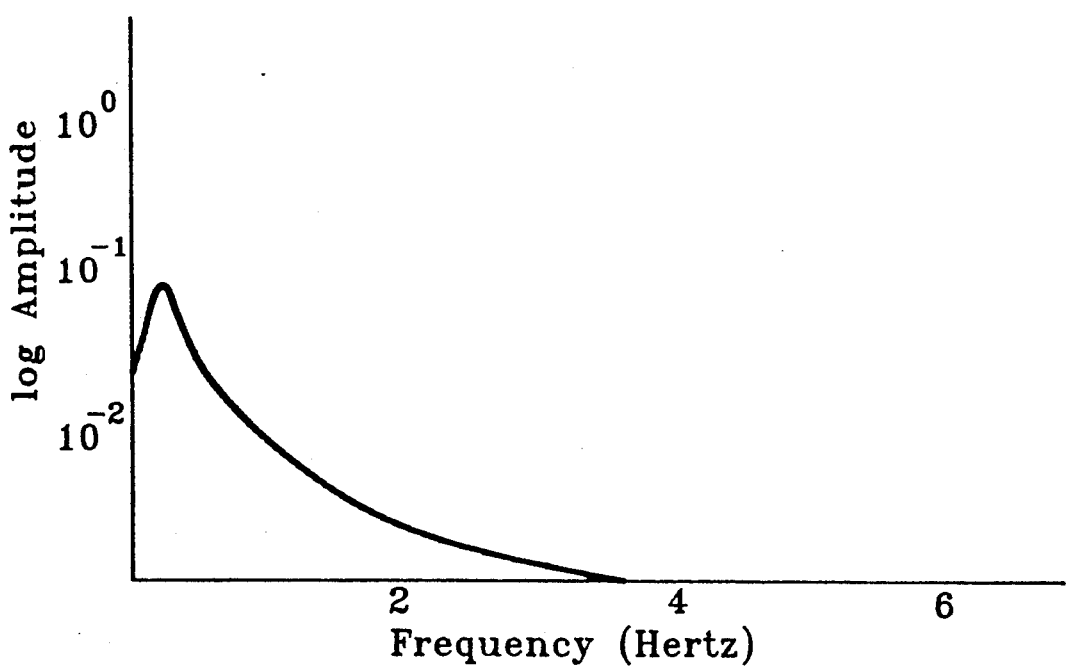
FIG. 7 illustrates the amplitude of vibration of the isolation stand when the connector of FIG. 4 connects the isolation stand at floor level to the enclosure of the registration tool.

This substantial elimination of transmission of vibration energy because of the positioning of the connector at floor level is supported by the data presented in FIGS. 6 and 7. As illustrated in FIG. 6, when this support was coupled between legs 15 and 16 approximately 5 inches above floor level, a significant amount of vibrational energy was transmitted through this connector. However, as illustrated in FIG. 7, with this connector coupled between the Isodamp pads at floor level, the amount of transmitted vibrational energy is low enough that it does not interfere with the degree of measurement precision (on the order of or less than several nanometers of shift) required to manufacture state of the art RAMS.

The dimensions and choice of material of the connector are determined primarily by the spacing between the devices to be connected to one another and do not significantly impact the vibration isolation or the stability of the separation between the two devices. In the particular embodiment presented in FIGS. 3-5, each of sections 48 and 49 has a width of about 4 inches, section 49 has a length of about 8 inches and section 48 has a length of about 3 inches. Each of the parts 45-47 is made of a plate of aluminum of thickness on the order of ⅜ inch. Damping pads 41 are each on the order of 3/16-¼ inch thick. The diameters of damping pads 41 and 44 and the diameters of semicircular recesses 410-413 are all approximately 3.5 inches.

I claim:
1. A device comprising:
   a first apparatus having a first leg that has a bottom end that is to be in contact with a floor when this device is used;
   a second apparatus having a second leg that has a bottom end that is to be in contact with the floor when this device is used; and
   a connector attached to the bottom end of the first leg and attached to the bottom end of the second leg, said connector couples there two legs together at floor level, whereby substantially no vibrational energy is coupled between the first and second legs from vertical components of vibrations in either of these legs.

2. A device as in claim 1 wherein said connector comprises:
   a center piece; and
   means for connecting this center piece to each of these legs at its bottom end, whereby substantially no vibrational energy is coupled between the first and second legs from vertical components of vibrations in either of these legs.

3. A device comprising:
   a first apparatus having a first leg that has a bottom end that is to be in contact with a floor when this device is used;

a second apparatus having a second leg that has a bottom end that is to be in contact with the floor when this device is used; and a connector attached to the bottom end of the first leg and attached to the bottom end of the second leg;

a first pad of damping material in contact with the bottom end of the first leg such that this pad will be between the bottom of this leg and the floor during use of this device; and wherein said means for connecting the center piece to each of these legs connects directly to this first pad of damping material and connects indirectly to the first leg by a contact force between the first pad and the first leg, whereby this pad of damping material further attenuates transmission of vibrational energy between these two legs.

4. A device as in claim 3 further comprising:

a second pad of damping material in contact with the bottom end of the second leg; and wherein said means for connecting the center piece to each of these legs connects directly to this second pad of damping material and connects indirectly to the second leg by a contact force between the second pad and the second leg, whereby this pad of damping material further attenuates transmission of vibrational energy between these two legs.

5. A device as in claim 3 wherein said means for connecting this center piece to the bottom end of each of these legs comprises:

a pair of end pieces, each having a recess adapted to fit around one side of a pad of damping material; and wherein said center piece has at opposite ends a pair of recesses, each of these recesses being adapted such that a recess in one of these ends and a recess in the center piece fit snugly about the pad of damping material.

6. A device as in claim 3 wherein said first apparatus includes an isolation stand having said first leg, whereby this first pad of damping material, which is typically utilized under a leg of such an isolation stand, can be incorporated as part of this connector, thereby reducing the cost of this connector.

7. A device comprising:

a first apparatus having a first leg that has a bottom end that is to be in contact with a floor when this device is used;

a second apparatus having a second leg that has a bottom end that is to be in contact with the floor when this device is used;

a connector attached to the bottom end of the first leg and attached to the bottom end of the second leg; and at the bottom end of the first leg, a levelling pad that is rotatable about an axis that is substantially perpendicular to the first leg and is substantially perpendicular to a direction from a bottom end of the first leg to a bottom end of the second leg, whereby this connector transmits an attenuated amount of any horizontal vibrations.

8. A device as in claim 7 wherein said levelling pad at the bottom of the first leg is a ball joint type leveling pad.

9. A device as in claim 7 further comprising:

at the bottom end of the second leg, a levelling pad that is rotatable about an axis that is substantially perpendicular to the second leg and is substantially perpendicular to a direction from a bottom end of the first leg to a bottom end of the second leg, whereby this connector transmits an attenuated amount of any horizontal vibrations.

10. A device as in claim 9 wherein said levelling pad at the bottom of the first leg and the levelling pad at the bottom of the second leg are each a ball joint type leveling pad.

* * * * *